US012178365B2

(12) United States Patent
Loutos

(10) Patent No.: US 12,178,365 B2
(45) Date of Patent: Dec. 31, 2024

(54) AUTOMATIC PEDESTAL TOILET

(71) Applicant: Peter Loutos, Port St. Lucie, FL (US)

(72) Inventor: Peter Loutos, Port St. Lucie, FL (US)

( * ) Notice: Subject to any disclaimer, the term of this patent is extended or adjusted under 35 U.S.C. 154(b) by 179 days.

(21) Appl. No.: 18/150,100

(22) Filed: Jan. 4, 2023

(65) Prior Publication Data

US 2023/0200600 A1 Jun. 29, 2023

Related U.S. Application Data

(63) Continuation-in-part of application No. 16/597,074, filed on Oct. 9, 2019, now abandoned.

(51) Int. Cl.
*A47K 17/02* (2006.01)
*B66F 3/24* (2006.01)
*B66F 3/25* (2006.01)
*E03D 11/12* (2006.01)

(52) U.S. Cl.
CPC ............ *A47K 17/028* (2013.01); *B66F 3/245* (2013.01); *B66F 3/25* (2013.01); *E03D 11/125* (2013.01)

(58) Field of Classification Search
CPC ..... A47K 17/028; E03D 11/125; B66F 3/245; B66F 3/25
USPC ............................................ 4/254, 420, 667
See application file for complete search history.

(56) References Cited

U.S. PATENT DOCUMENTS 4,091,473 A * 5/1978 Matthews ............. E03D 11/125 4/667
4,584,725 A * 4/1986 Oliver .................. A47K 17/028 4/254
5,461,736 A * 10/1995 Carpenter ................. B66F 5/04 187/244
8,336,130 B1 * 12/2012 Cardenas ............. E03D 11/125 4/420

* cited by examiner

*Primary Examiner* — Tuan N Nguyen
(74) *Attorney, Agent, or Firm* — Edison Law Group

(57) ABSTRACT

A pedestal toilet system that allows individuals to adjust the position, height or orientation of a toilet in accordance to their comfort levels and health related needs. Conventional toilet systems do not have retractable footrests or pedestals incorporated into the toilet as one unit. This adjusting pedestal height allows the user to use the restroom in an ideal manner.

19 Claims, 9 Drawing Sheets

AUTOMATIC PEDESTAL TOILET

CROSS REFERENCE TO RELATED APPLICATION

This application is a continuation-in-part of application Ser. No. 16/597,074 filed on Oct. 9, 2019. The content of the parent application is incorporated by reference herein in its entirety. The applicant claims full priority based on the parent application.

BACKGROUND

Field of the Invention

The present invention relates to toilets and toilet systems.

Description of the Related Art

In any building, residential, commercial or industrial, the bathroom is one of the most used and vital places. Essential to human life is the proper cleansing of the bowels to promote maximum health. When a person defecates at a toilet, they may adopt a sitting position or a squatting position. Various medical studies have shown that the squatting position is the most efficient position a human being can assume when defecating. In the squatting position, the angle of the spine is optimally aligned or oriented to allow the user to completely, thoroughly and efficiently cleanse their bowels.

In addition, many people in the world do not have a safe way to use bathroom facilities.

The modern-day toilet most commonly used in the western world consists of multiple features to facilitate the user. Many conventional toilets facilitate the user with either an automatic flush system or automatic fragrance system for removal of odors and noxious fumes, etc. In addition, there are numerous "smart" toilets which also offer "spa" features for the user. However, such toilets are configured for the user to adopt the sitting position rather than the squatting position. Medical doctors, naturopaths and holistic health professionals have documented the hazards of conventional toilets and their shortcomings. There is empirical evidence that conventional western toilet systems do not promote proper hygiene for the user. As such, there has been a long-felt need for the development of a toilet system that allows individuals to adjust the position, height or orientation of a toilet in accordance to their comfort levels and health related needs.

One means to achieve the squatting position with a conventional toilet is to provide an additional piece to be used in conjunction with the toilet. The additional piece may be a stool for a user to place their feet upon while sitting on the toilet. However, the need for an additional piece is somewhat unwieldy and inconvenient. In addition, the additional piece typically has a single fixed height that may or may not be suitable for a particular user.

It is understood that none of the above-described prior art means or methods have been found to be completely suitable to meet the needs of humans. Typical conventional means and methods are cumbersome or simply not suitable. Furthermore, the need for the squatting position may be greater for people with certain disabilities. Such persons may find the shortcomings of conventional means and methods to particularly significant.

Moreover, conventional toilet systems do not have retractable footrests or pedestals incorporated into the toilet as one unit.

Hence, the present invention proposes to resolve and surmount the existing technical difficulties and to eliminate the aforementioned shortcomings of the prior art.

BRIEF SUMMARY OF THE INVENTION

The following summary is provided to facilitate an understanding of some of the innovative features unique to embodiments of the present invention, and is not intended to be a full description. A full appreciation of the various aspects of the embodiments can be gained by considering the entire specification, claims, drawings, and abstract as a whole.

In light of the disadvantages of the prior art, one object of the present invention is to provide a toilet system equipped with pedestals.

Another object of the present invention is to provide selectable elevation of a seat of a toilet.

To achieve these and other objects, an automatic adjuster model of a toilet provides pedestals that are conveniently stowed (accommodated) in separate compartments directly adjacent to sides of a main base of the toilet. That is, the pedestals are conveniently recessed in encasements when not in use. Then when the pedestals are needed, they are released from the stowed position. When the pedestals are released, they are extended forward and then elevated to a desired height. The toilet also has a movable base that can raise a seat of the toilet to a desired height.

A user simply presses a control button to release the pedestals. The user then has the option to adjust the height of the pedestals. Moreover, different height levels of the movable base can be achieved by pressing another control button. These features enable a user to achieve the most efficient and comfortable squatting position for their individual needs.

The above-described features eliminate the need for a user to add any type of additional device currently found on the market to achieve the squatting position.

The applicant asserts that the present toilet system actually creates a new category in toilet design: pedestal toilets. It is believed this new category will set a high standard for toilet design worldwide, based upon its superior design which furthers conventional art and achieves greater health for the user. The new standard should be applied universally around the globe to improve the wellbeing of all humans.

In many countries, government laws and regulations require the use of facilities which meet certain health standards. The U.S. Government Aid for Disabilities Act is an example of a law which aims to assist disabled people. The present pedestal toilet enables many of such persons to much more easily and comfortably defecate efficiently for maximum health. The present embodiments also benefit people who suffer temporary or permanent disabilities which may otherwise preclude convenient use of a toilet.

It is believed that there is nothing in conventional art which involves the technology or offers the advantages of the present embodiments. The automatic, elevating pedestals and automatic elevation of a movable base satisfy a need which heretofore has not been adequately addressed by any toilet system found anywhere in the world.

It is contemplated that the unique features of the present invention will be accepted universally as a crucial step forward in promoting worldwide health. The toilet is considered to be highly desirable for residential, commercial and industrial use.

This summary is provided merely for the purposes of outlining some example embodiments, so as to provide a basic understanding of some aspects of the subject matter described herein.

Accordingly, it will be appreciated that the above-described features are merely examples and should not be construed to narrow the scope or spirit of the subject matter described herein in any way. Other features, aspects, and advantages of the subject matter detailed herein will become apparent from the following description, figures, and claims.

In the accompanying figures, like reference numerals refer to identical or functionally similar elements throughout the separate views. The figures, together with the detailed description below, are incorporated in and form part of the specification. The figures serve to further illustrate embodiments of concepts that include the claimed invention, and to explain various principles and advantages of those embodiments.

BRIEF DESCRIPTION OF THE DRAWINGS

The foregoing summary, as well as the following detailed description of preferred embodiments of the present invention, will be better understood when read in conjunction with the appended drawings. For the purpose of illustrating the present invention, there are shown in the drawings embodiments which are presently preferred. It is understood, however, that the invention is not limited to the precise arrangements and instrumentalities shown.

Figure 1A:
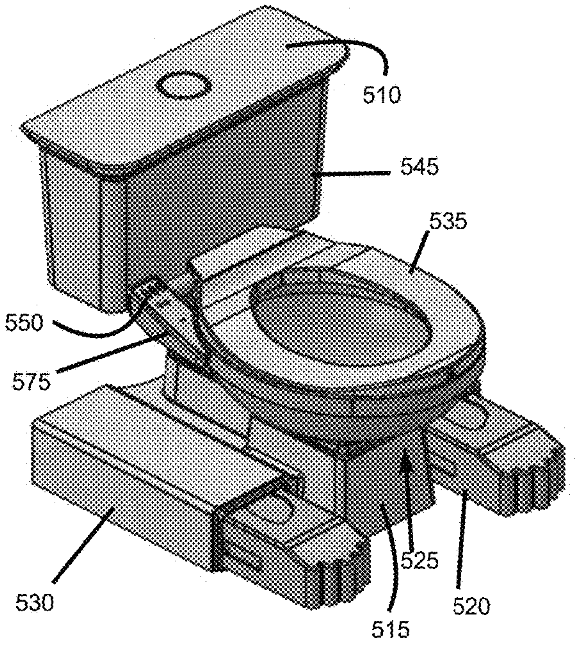
FIG. 1A is an isometric view of a pedestal toilet in accordance with an exemplary embodiment of the present invention.
Figure 1B:
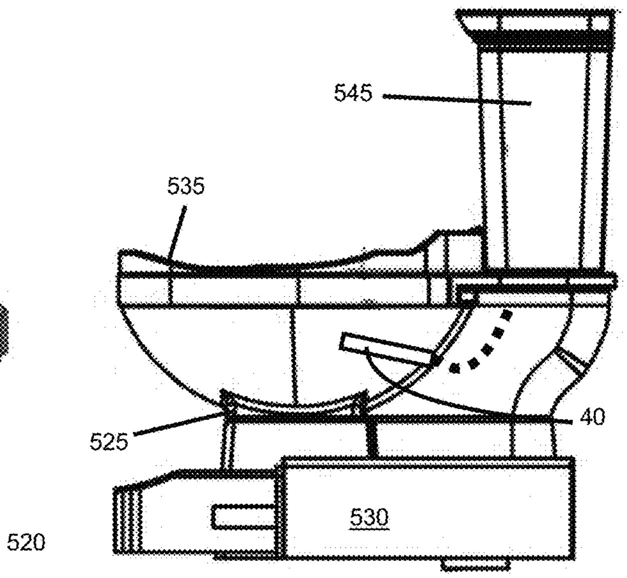
FIG. 1B is a side view, partly in section, of the pedestal toilet.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings. The drawings show only those specific details that are pertinent to understanding embodiments of the present invention, so as not to overfill the disclosure with details that will be readily apparent to those of ordinary skill in the art having the benefit of the description herein.

DETAILED DESCRIPTION OF THE INVENTION

Detailed descriptions of preferred and exemplary embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriately detailed system, structure or manner.

Reference throughout this disclosure to "one embodiment," "certain embodiments," and "an embodiment" or similar terms mean that a particular feature, structure, or characteristic described in connection with the embodiment is included in at least one embodiment of the present invention.

Thus, the appearance of such phrases in various places throughout this specification are not necessarily all referring to the same embodiment. Furthermore, the particular features, structures, or characteristics may be combined in any suitable manner in one or more embodiments without limitation.

The present invention provides a pedestal toilet. Such toilets come equipped with pedestals housed directly adjacent to a base of the toilet as one unit. Unlike conventional assemblies, these convenient pedestals raise the feet of a user to facilitate defecation.

The present invention also provides elevation of the base of the toilet if and as desired, to further enhance the position of the user.

All the above-described features significantly increase the efficacy of using a toilet. In particular, there is no need for any additional device to achieve the squatting position.

Referring to FIGS. 1A-2 and 9, a pedestal toilet 510 in accordance with an exemplary embodiment of the present invention is shown. The pedestal toilet 510 includes a main base 515, a movable base 525 located within and above the main base 515, a lid seat 535, a cistern 545, a pair of compartments 530, a pair of pedestals 520, a first actuator 555, a lifting mechanism 565, a controller 575 located within a control panel 549, and a plurality of buttons 550.

The movable base 525 can ascend and descend relative to the main base 515. The pedestals 520 are normally stored inside the compartments 530. The pedestals 520 are horizontally extendable out from the compartments 530, and once horizontally extended the pedestals 520 are raisable. From a raised position, the pedestals 520 are lowerable; and once lowered the pedestals 520 are horizontally retractable back into the compartments 530.

In the illustrated embodiment, a control panel 549 is located adjacent to a rear of a lid seat 535, between the lid seat 535 and the cistern 545. The control panel includes the buttons 550 and the controller 575. The controller 575 is typically a microcontroller located within the control panel 549. The buttons 550 are electrically connected to the controller 575, and the controller 575 is electrically connected to the first actuator 555 and the lifting mechanism 565. Various of the buttons 550 are operable by the user to extend and raise the pedestals 520, lower and retract the pedestals 520, and raise and lower the movable base 525.

Figure 2:
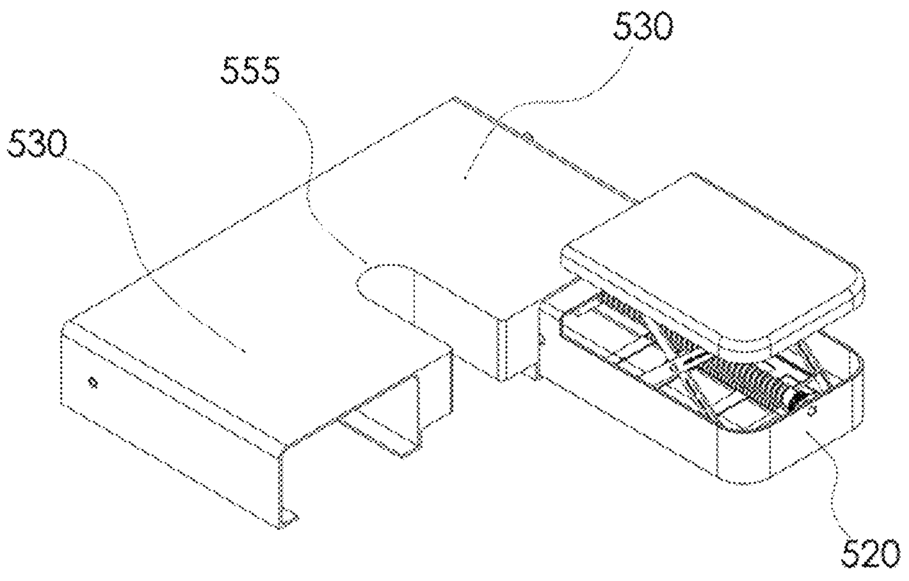
FIG. 2 is an isometric view of two compartments and one pedestal of the toilet of FIG. 1.
Figure 3:
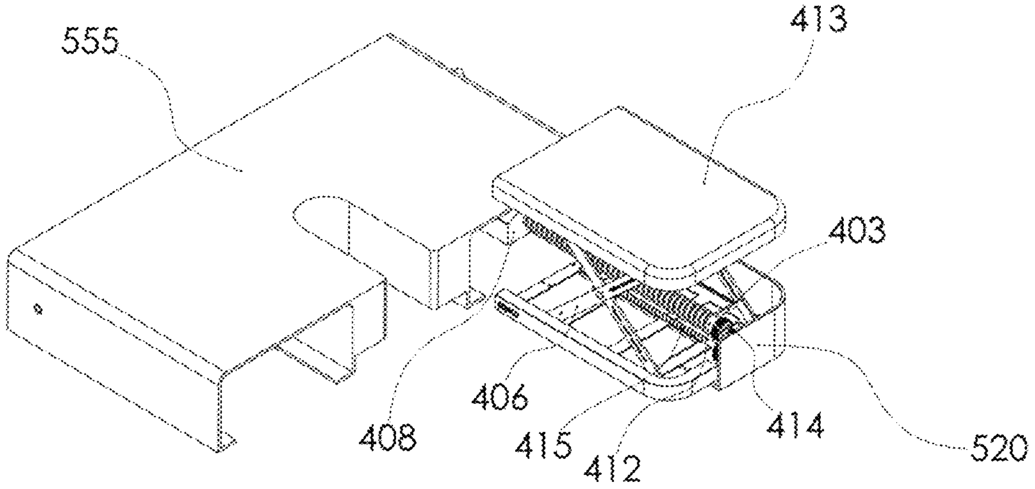
FIG. 3 is a cutaway view of FIG. 2.
Figure 4:
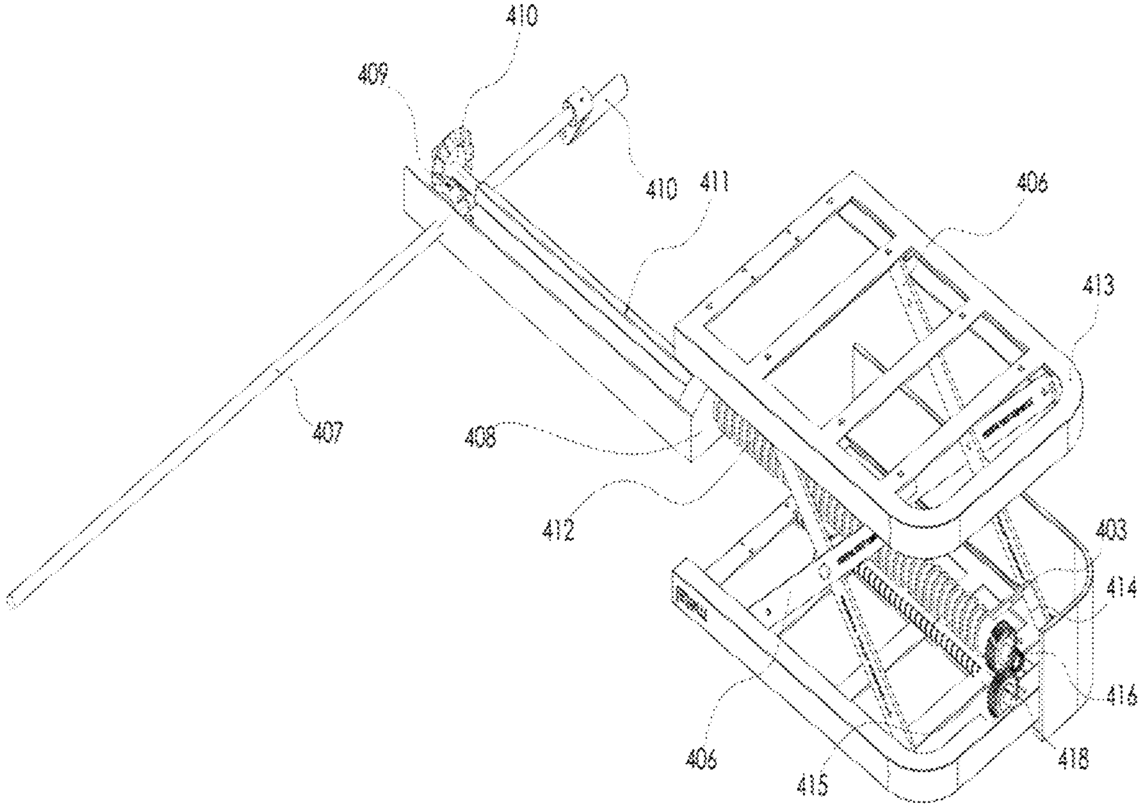
FIG. 4 is an enlarged, isometric view of a driving mechanism of the toilet of FIG. 1.
Figure 5:
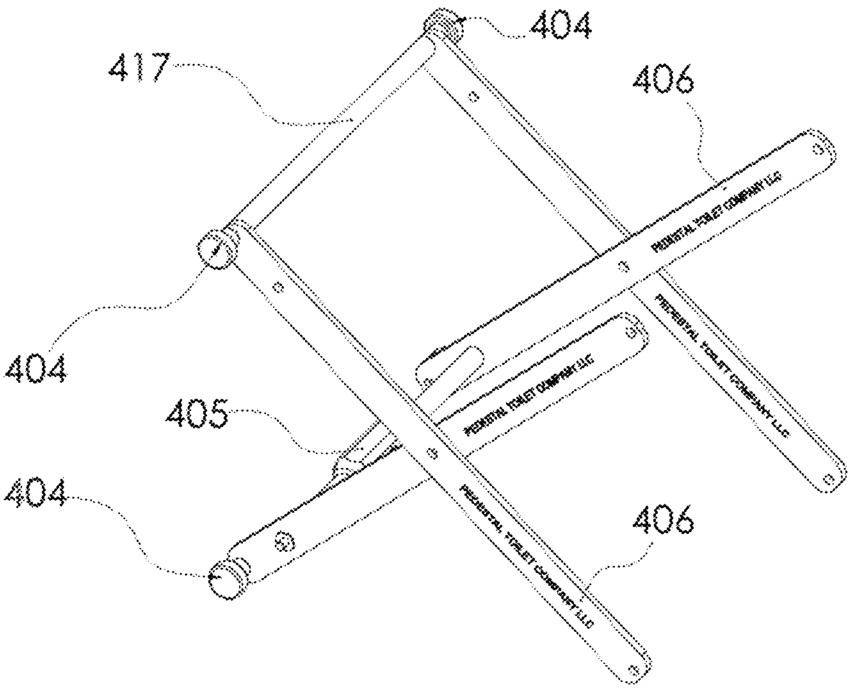
FIG. 5 is an isometric view of arms of the driving mechanism of FIG. 5.
Figure 6:
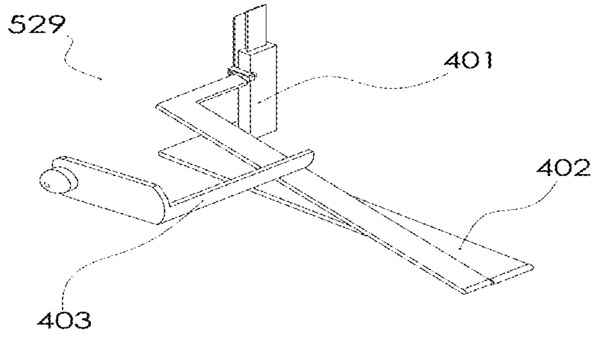
FIG. 6 is an enlarged, isometric view of a gearwheel alignment mechanism of the driving mechanism of the toilet of FIG. 1.
Figure 7:
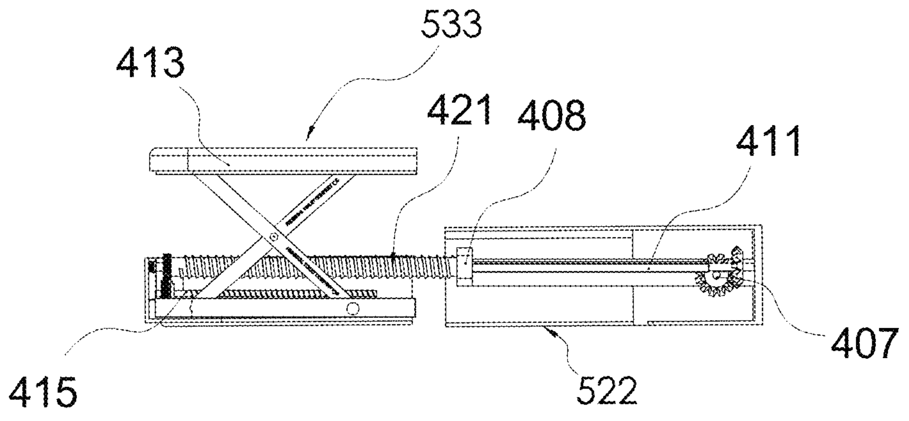
FIG. 7 is a cutaway view of one compartment and the pedestal of FIG. 2.
Figure 8:
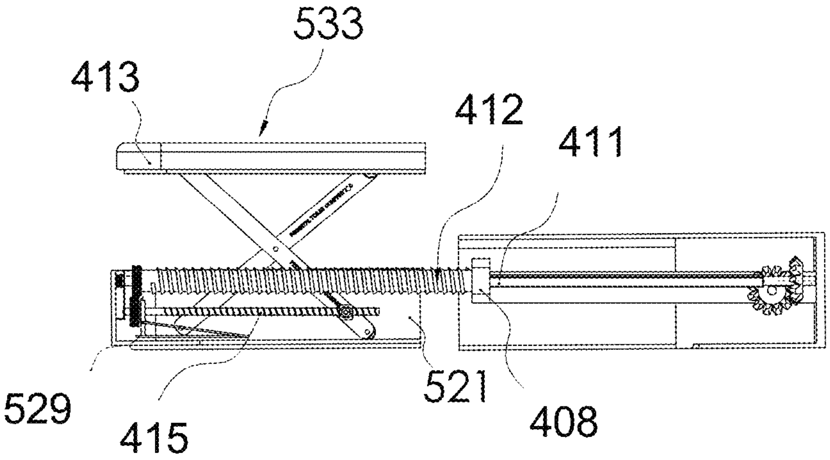
FIG. 8 is a cutaway view FIG. 7.

Referring to FIGS. 2-4, the first actuator 555 is located between the compartments 530, at a rear of the main base

515. The first actuator 555 is typically an electric motor with a rotatable drive shaft 407. The drive shaft 407 extends horizontally into the compartments 530. The drive shaft 407 has a pair of driving cogs 409, positioned corresponding to the compartments 530. Teeth of each of the driving cogs 409 face away from the motor.

Referring also to FIGS. 5-8, each compartment 530 includes a housing which encloses a corresponding pedestal 520, and a worm block 408 inside a front end of the housing. The worm block 408 is attached to the housing. For example, the worm block 408 can be part of an L-shaped bracket, with a main length of the bracket attached to a side wall of the housing.

Each pedestal 520 includes a tray 521, a driving mechanism 522, and a cantilevered footrest mechanism 533. When the pedestal 520 is in a stowed position inside the compartment 530, the tray 521 accommodates the driving mechanism 522 and the footrest mechanism 533.

The driving mechanism 522 includes a spindle 411, a driven cog 410, a first worm rod 412, a driving gearwheel 414, a blocking wall, a coil spring 416, a driven gearwheel 418, a second worm rod 415, and a gearwheel alignment mechanism 529.

The footrest mechanism 533 includes a pair of bottom rails, a pair of top rails, a pair of crossed first legs 406, a pair of crossed second legs 406, a first pair of bottom wheels 404, a second pair of bottom wheels 404, a first pair of top wheels 404, a second pair of top wheels 404, a platform (or footrest) 413, a first crossbeam, and a second crossbeam 417. The two footrests 413 are for the user to place their feet on when sitting on the toilet 510.

In the driving mechanism 522, the driven cog 410 is attached to a rear end of the spindle 411. Teeth of the driven cog 410 face toward a front of the pedestal 520. The driven cog 410 is oriented perpendicular to the corresponding driving cog 409, and is meshed with the corresponding driving cog 409. The spindle 411 has a square transverse cross-section. The first worm rod 412 is hollow, and has an outer diameter greater than an outer diameter of the spindle 411. A transverse cross-section of the hole of the hollow first worm rod 412 is square, and a size of the hole matches a size of the spindle 411. Each of a front end and a rear end of a main body of the first worm rod 412 does not have the worm. Instead, each of the front and rear ends is a smooth cylinder. A length of the cylinder of the rear end is the same as or greater than a corresponding thickness of the worm block 408 of the housing.

The front end of the first worm rod 412 has a head extending coaxially from the main body. The head includes a first neck portion extending coaxially from the main body, a second neck portion extending coaxially from the first neck portion, and an end portion extending coaxially from the second neck portion. A diameter of the first neck portion is less then a diameter of the second neck portion, and the diameter of the second neck portion is less than the diameter of the end portion. The driving gearwheel 414 is attached around the first neck portion of the head.

The blocking wall is parallel to a front wall of the tray 521, and located a short distance rear of the front wall. A hole is defined in the blocking wall. A position and a diameter of the hole correspond to the end portion of the head of the first worm rod 412. The end portion of the head is rotatably and slidably engaged in the hole of the blocking wall.

In one embodiment, the coil spring 416 is in the shape of a frustum of a cone. A small end of the coil spring 416 is attached to the front wall of the tray 521. The coil spring 416 is aligned with the hole of the blocking wall, and a large end of the coil spring 416 is adjacent to the blocking wall.

The second worm rod 415 is positioned below the first worm rod 412. A front end of the second worm rod 415 is rotatably attached to the blocking wall below the hole. The driven gearwheel 418 is attached to the front end of the second worm rod 415, and abuts a rear of the blocking wall In this position, the driven gearwheel 418 can mesh with the driving gearwheel 414 (see below).

The gearwheel alignment mechanism 529 is located at a front of the tray 521 inside the tray 521, at one lateral side of the second worm rod 415. The gearwheel alignment mechanism 529 includes an L-shaped base plate 402, a spring ramp extending obliquely upward from a rear end of the base plate 402, a horizontal control arm extending perpendicularly inward from a front end of the spring ramp, and a sliding post extending coaxially from a distal end of the control arm. The gearwheel alignment mechanism 529 also includes a guiding post 401 extending vertically up from an inner end of a front of the base plate 402, a vertical alignment post slidably engaged with the guiding post 401, and a sliding post track extending horizontally rearward from a bottom of an outer lateral side of the alignment post. The gearwheel alignment mechanism 529 further includes a holding bar 403 (see below).

In one embodiment, the alignment post of the gearwheel alignment mechanism 529 has a plate portion and a reduced rail portion extending from a rear of the plate portion. The rail portion has a trapezoidal transverse cross-section, with a transverse width of the rail portion gradually increasing in a direction away from the plate portion. The guiding post 401 has a central channel defining a trapezoidal transverse cross-section. The shape and size of the channel match the shape and size of the rail portion of the alignment post.

The cantilevered footrest mechanism 533 includes the pair of crossed first legs 406 hinged together at their centers, the pair of crossed second legs 406 hinged together at their centers, a pair of lower wheel tracks, a pair of upper wheel tracks, a pair of lower front wheels 404, a pair of lower rear wheels 404, a pair of upper front wheels 404, a pair of upper rear wheels 404, the first crossbeam having a central worm block portion 405, and the footrest 413.

The pair of crossed first legs 406 and the pair of crossed second legs 406 are at opposite lateral sides of the footrest mechanism 533, respectively. The pair of lower front wheels 404 and the pair of lower rear wheels 404 are rotatably attached to bottom ends of the first and second crossed legs 406. The pair of upper front wheels 404 and the pair of upper rear wheels 404 are rotatably attached to top ends of the first and second crossed legs 406.

The pair of lower wheel tracks are at opposite lateral sides of the tray 521. Each lower wheel track is attached to at least one of a corresponding sidewall of the tray 521 and a bottom of the tray 521. The lower wheel track includes a longitudinal plate at an outer lateral side thereof, and a longitudinal upper flange and a longitudinal lower flange at an inner lateral side thereof. The upper and lower flanges are separated by a longitudinal gap. With this configuration, corresponding lower front and rear wheels 404 are movably held in the lower wheel track, with axles of the corresponding lower front and rear wheels 404 horizontally movable along the gap.

The pair of upper wheel tracks are at the opposite lateral sides of the footrest mechanism 533, and are attached to an underside of the footrest 413 at opposite lateral sides of the footrest 413. Each upper wheel track includes a longitudinal plate at an outer lateral side thereof, and a longitudinal upper flange and a longitudinal lower flange at an inner lateral side thereof. The upper and lower flanges are separated by a longitudinal gap. With this configuration, corresponding upper front and rear wheels 404 are movably held in the upper wheel track, with axles of the corresponding upper front and rear wheels 404 horizontally movable along the gap.

One of the legs 406 of the pair of first legs 406 has a bottom end located nearer a front of the tray 521. Such leg 406 is referred to herein as the front-up first leg 406. The other leg 406 of the pair of first legs 406 has a bottom end located nearer a rear of the tray 521. Such leg 406 is referred to herein as the rear-up first leg 406. One of the legs 406 of the pair of second legs 406 has a bottom end located nearer a front of the tray 521. Such leg 406 is referred to herein as the front-up second leg 406. The other leg 406 of the pair of second legs 406 has a bottom end located nearer a rear of the tray 521. Such leg 406 is referred to herein as the rear-up second leg 406. One end of the first crossbeam is attached to the bottom end of the rear-up first leg 406. An opposite end of the first crossbeam is attached to the bottom end of the rear-up second leg 406. The second worm rod 415 is rotatably engaged in the worm block portion 405 of the first crossbeam. One end of the second crossbeam 417 is attached to the top end of the front-up first leg 406. An opposite end of the second crossbeam 417 is attached to the top end of the front-up second leg 406.

The front-up second leg 406 has the holding bar 403 attached to an inner side thereof, near the bottom end thereof. The holding bar 403 extends horizontally inward from the front-up second leg 406. In one embodiment, the holding bar 403 is comprised in an L-shaped piece, with a portion of the L-shape piece perpendicular to the holding bar 403 being attached to the front-up second leg 406.

When the holding bar 403 is at a forwardmost position, the holding bar 403 is located at a front end of the spring ramp. In this position, the holding bar 403 presses down on the spring ramp, such that the spring ramp elastically biases the holding bar 403. Then when the front-up second leg 406 moves rearward gradually, the holding bar 403 moves rearward and upward, sliding along the spring ramp. This direction of movement, coupled with the slanted orientation of the spring ramp, allows the spring ramp to elastically recover gradually by bending upward. This causes the alignment post to rise gradually. Simultaneously, the sliding post slides rearward along the sliding post track from a frontmost position. Once the holding bar 403 has moved a certain distance rearward, it loses contact with the spring ramp. At this point, the spring ramp is in a relaxed state, the alignment post is at an uppermost position, and the sliding post is at a rearmost position. In the uppermost position, the alignment post abuts both the driving gearwheel 414 and the driven gearwheel 418. Thereby the driving and driven gearwheels 414, 418 are both sandwiched between the blocking wall and the alignment post, and so are kept in alignment with each other.

A stopper is provided on an underside of a top wall of the housing of each compartment 530, near a front of the compartment 530. When the corresponding tray 521 extends out from the compartment 530, a rear wall of the tray 521 is blocked by the stopper, thereby preventing the tray 521 from falling out from the compartment 530.

Figure 9:
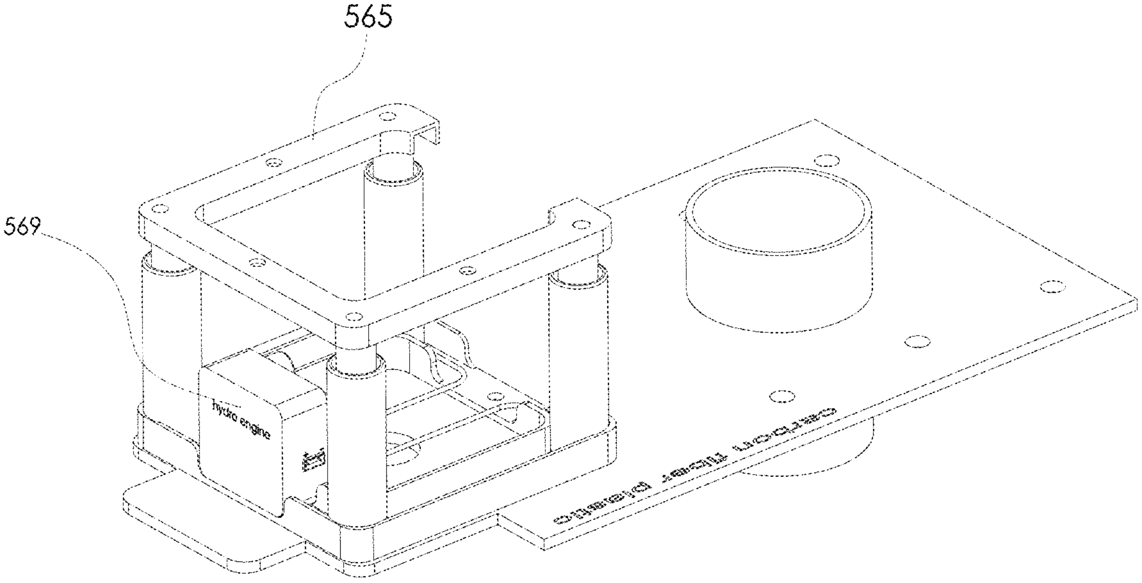
FIG. 9 is an enlarged, isometric view of a lifting mechanism of the toilet of FIG. 1.
Figure 10:
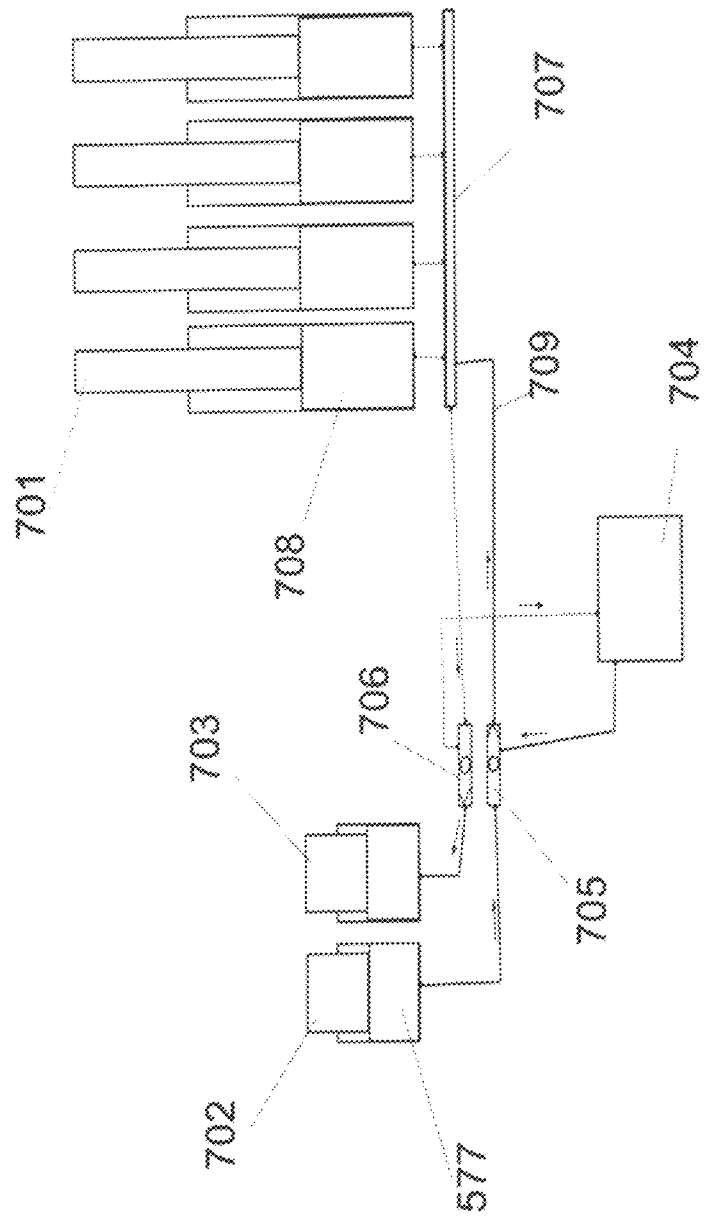
FIG. 10 is a schematic view of a hydraulic mechanism of the lifting mechanism of FIG. 9.

Referring to FIGS. 9 and 10, the lifting mechanism 565 of the pedestal toilet 510 is shown. The lifting mechanism 565 can be a hydraulic piston system, or any suitable mechanism capable of raising and lowering the movable base 725.

In the illustrated embodiment, the lifting mechanism 565 is contained within the main base 515, and is attached to an underside of the movable base 525. The lifting mechanism 565 includes a rectangular (or square) base, four hydraulic pistons extending up from four corners of the base, a U-shaped top frame, and a second actuator 569. The top frame is attached to tops of the four pistons, and to the underside of the movable base 525. The second actuator 569 is located on the base between two front pistons, and includes an electric pump and a hydraulic mechanism. At least part of the second actuator 569 is contained within the main base 515. The electric pump is electrically connected to the controller 575, and the hydraulic mechanism is operatively connected to the four pistons. Each piston includes a piston cylinder 708 and a piston arm 701.

The hydraulic mechanism includes a reservoir 704, a regulator 707 operatively connected to bottoms of the four pistons and to the reservoir 704, valves 705, 706, hydraulic lines 709, and hydraulic fluid.

In operation of the pedestals 520, they are extended out from the compartments 530 and then raised as follows. The user presses one of the buttons 550. The button 550 sends a signal to the controller 575, and the controller 575 activates the first actuator 555. The motor rotates the driving cogs 409, and the driving cogs 409 rotate the driven cogs 410.

In each pedestal 520, the spindle 411 rotates in unison with the driven cog 410, and drives the first worm rod 412 to rotate. Because the first worm rod 412 is rotatably engaged through the worm block 408, the first worm rod 412 moves forward. The first worm rod 412 pushes on the coil spring 416, and thereby pushes the front wall of the tray 521 forward. Thus the pedestal 520 moves forward and emerges from the corresponding compartment 530. In this process, the first worm rod 412 slides further and further off the spindle 411, but with the spindle 411 still remaining engaged inside the first worm rod 412. The pedestal 520 continues to move forward until the rear wall of the tray 521 is stopped by the stopper. At this point, the first worm rod 412 continues to move forward, thereby compressing the coil spring 416, until the driving gearwheel 414 meshes and aligns with the driven gearwheel 418. Once such position is reached, the worm of the first worm rod 412 has completely exited the worm block 408, such that the smooth cylinder of the rear end of the first worm rod 412 is located in the worm block 408.

At this point, with the first worm rod 412 continuing to rotate, the driving gearwheel 414 begins to rotate the driven gearwheel 418. The second worm rod 415 rotates in unison with the driven gearwheel 418. Because the second worm rod 415 is rotatably engaged through the worm block portion 405 of the first crossbeam, the second worm rod 415 pulls the first crossbeam forward.

The first crossbeam pulls the rear-up first leg 406 and the rear-up second leg 406 forward. Thereby, the rear-up first and second legs 406 drive the footrest 413 upward, and the footrest 413 pulls the front-up first leg 406 and the front-up second leg 406 rearward. As the front-up second leg 406 moves rearward, it gradually releases the spring ramp, and the alignment post moves up to its topmost position. In the topmost position, the alignment post helps ensure that the driving and driven gearwheels 414, 418 are properly aligned with each other and can operate effectively.

The second worm rod 415 continues to rotate until a desired height of the footrest 413 is reached. Thus overall, the two pedestals 520 are moved in unison to a level suitable for the user.

In one embodiment, a number of different predetermined heights of the footrest 413 are preconfigured in the controller 575. For example, there can be five predetermined heights. The user can select which of the five heights they want by pressing an appropriate one (or more) of the buttons 550.

Lowering of the pedestals 520 and retraction of them into the compartments 530 involves a process essentially the reverse of the above-described extending and raising process.

In one embodiment, a number of different predetermined heights of the movable base 525 are preconfigured in the controller 575. For example, there can be five predetermined heights. The user can select which of the five heights they want by pressing an appropriate one (or more) of the buttons 550.

In one embodiment, the toilet system can also include "spa" features. The toilet system can comprise of one or more of a seat warmer, bidet jet spray, hydro-flush, sound system and air freshener. Each of these features can be activated or deactivated by the press of a button or a combination of buttons 550 as selected by the user per their preference. Each of the five features can be activated by the user by pressing buttons 550 which are conveniently located on the base of the toilet. In this embodiment, controller 575 for receiving the signal from one or more buttons 550 being pressed by the user. Wherein, each of the buttons 550 or a combination thereof signal to the controller 575 a user preference or choice, that is predetermined. In a preferred embodiment, the buttons 550 are in three pairs, with each pair having directional arrow indicia thereon to indicate up or down of the corresponding actuator assembly. One pair 550 are for raising and lowering the pedestals, with another pair 550 for raising and lowering the movable base. A third pair 550 can be assigned to operate additional features as will be explained in more detail later. Upon receiving the signal from buttons, the controller 575 activates one or more of the features selected from a seat warmer, bidet jet spray 40, hydro-flush, sound system and air freshener.

In addition, an electric motor, powered by a power source can be implemented to ensure the operability of one or more of the aforementioned features. In another embodiment, a bidet jet spray system 40 can be activated at the touch of a button or combination of buttons 550. The conventional method when using the toilet is to use some type of paper tissue to clean the user after using the toilet. However, after many studies it has been proven that the use of tissues doesn't cleanse the area properly and optimum sanitary conditions are not achieved. The bidet jet spray system 40 keeps the water pressure to a level which satisfies the needs of its user and completes the hygienic requirement successfully. The system 40 includes a spray nozzle 42 which extends toward an open central portion of the bowl, the nozzle 42 directing a spray of water to clean the user.

Figure 11:
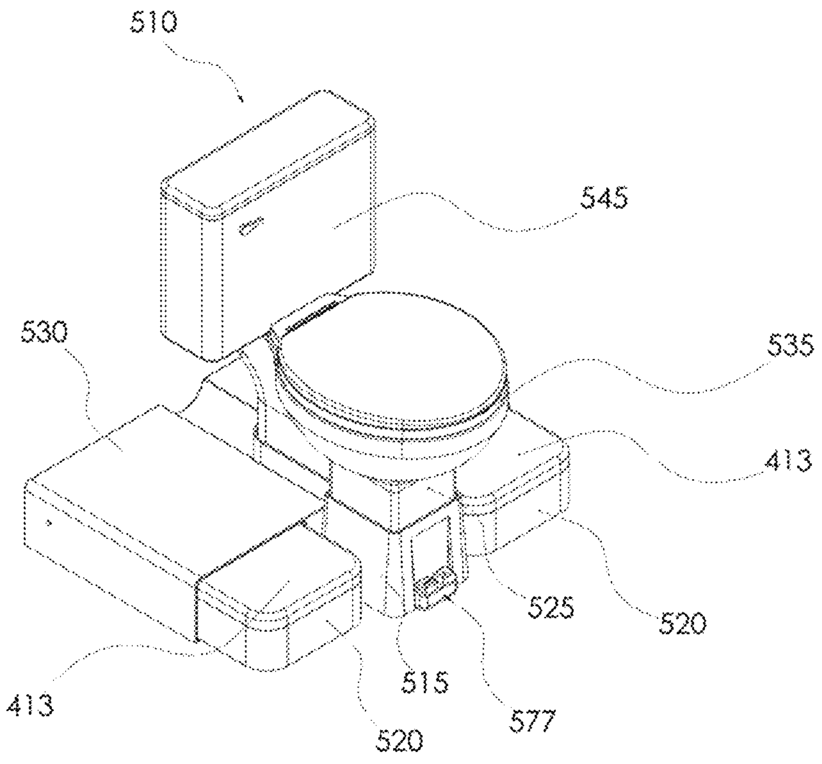
FIG. 11 is an isometric view of a pedestal toilet in accordance with another exemplary embodiment of the present invention.

Referring to FIG. 11, a user powered pedestal toilet 510 in accordance with an alternative exemplary embodiment of the present invention is shown. The user powered pedestal toilet 510 is similar to the above-described pedestal toilet 510. The main difference is that the alternative pedestal toilet 510 further includes a user operated pedal mechanism 577. (The plurality of buttons is not shown in FIG. 11.)

The pedal mechanism 577 includes a pair of operation pedals. The pedals are attached to a front of the fixed base 515. The pedals include an "Up" pedal for raising the movable base 525, and a "Down" pedal for lowering the movable base 525. The pedals are electrically connected to the controller 575. When a user presses a selected pedal, the second actuator 569 raises or lowers the movable base 525.

In an embodiment of the present invention, each compartment 130 is configured with a cover to provide for additional protection. Each of the first and second actuators 555, 569 can be affixed in a variety of ways that would allow for safe electrical conductivity. For example, the second actuator 569 can be affixed to the movable base 525 by a set of fasteners.

In another embodiment of the present invention, the pedestal toilet 510 can be configured with a sleeve cover, which is wrapped around the sitting area of the toilet 510. The sleeve cover can provide anti-slippage protection for the user to prevent them from slipping off the toilet 510, no matter whether the toilet 510 is stationary or in motion.

In a further embodiment of the present invention, the pedestal toilet 510 is also configured with a tank sleeve, which is wrapped around the cistern 545. The tank sleeve is configured to provide additional protection for the user to grip, brace, or lean against to gain their balance, and for the user to prepare for the toilet 510 moving in a vertical direction or a horizontal direction.

In summary, the present invention is applicable in practically all settings to promote better health. These include residential, commercial, industrial and public use facilities.

It is noted and anticipated that although the inventive embodiments are shown in their most simple form, various components and aspects of the embodiments may be differently shaped or slightly modified when carrying out the invention herein. As such, those skilled in the art will appreciate the descriptions and depictions set forth in this disclosure are merely meant to portray examples of modes within the overall scope and intent of the present invention, and are not to be considered limiting in any manner.

The present invention includes other applications ascertainable and developable by one skilled in the art. In addition, the above explications of the features of the embodiments do not limit the claims herein.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects as only illustrative, and not restrictive; and the scope of the present invention is, therefore, indicated by the appended claims rather than by the foregoing description or drawings. Consequently, while the present invention has been described with reference to particular embodiments, it is understood that modifications of structure, sequence, materials and the like apparent to those skilled in the art still fall within the ambit of the invention as claimed by the applicant. While all of the fundamental characteristics and features of the invention have been shown and described herein, with reference to particular embodiments thereof, it is understood that a latitude of modification, various changes and substitutions are intended in the foregoing disclosure; and it will be apparent that in some instances, some features of the invention may be employed without a corresponding use of other features without departing from the scope of the invention as set forth. It should also be understood that various substitutions, modifications, and variations may be made by those skilled in the art without departing from the spirit or ambit of the invention. Consequently, all such modifications and variations and substitutions are included within the scope of the invention as defined by the following claims.

The invention claimed is:

1. A pedestal toilet comprising: a main base;

a movable base positioned within and above the main base; a pair of pedestals adjacent to the main base;

a control panel having a plurality of manually operated switches;

a first actuator assembly for extending, retracting, raising, and lowering the pedestals; a second actuator assembly for raising and lowering the movable base; and a controller electrically connected to the switches for controlling the first and second actuators.

2. The pedestal toilet of claim 1, wherein said manually operated switches are push buttons, and a first button of the push buttons is configured to extend and raise the pedestals.

3. The pedestal toilet of claim 2, wherein a second button of the push buttons is configured to lower and retract the pedestals.

4. The pedestal toilet of claim 1, wherein a third button of the push buttons is configured to raise the movable base.

5. The pedestal toilet of claim 4, wherein a fourth button of the buttons is configured to lower the movable base.

6. The pedestal toilet of claim 1, further comprising a pair of compartments adjacent to the main base, wherein the pedestals are contained within the compartments when the pedestals are in a retracted position.

7. The pedestal toilet of claim 1, wherein the first actuator comprises an electric motor with a rotatable drive shaft.

8. The pedestal toilet of claim 7, wherein each pedestal comprises a driving mechanism operatively coupled to the first actuator for extending and retracting the pedestal.

9. The pedestal toilet of claim 8, wherein each pedestal further comprises a cantilevered footrest mechanism operatively coupled to the driving mechanism for raising and lowering the pedestal.

10. The pedestal toilet of claim 9, wherein each pedestal further comprises a footrest at a top of the footrest mechanism, and the footrest is raisable and lowerable by operation of the footrest mechanism.

11. The pedestal toilet of claim 1, further comprising a lifting mechanism attached to the movable base, wherein the lifting mechanism comprises the second actuator.

12. The pedestal toilet of claim 11, wherein the lifting mechanism further comprises a plurality of hydraulic pistons, the second actuator comprises an electric pump and a hydraulic mechanism, the electric pump is electrically connected to the controller, and the hydraulic mechanism is operatively coupled to the pistons.

13. The pedestal toilet of claim 1, further comprising a toilet seat above the movable base.

14. A pedestal toilet comprising: a main base;

a movable base within and above the main base; a pair of pedestals adjacent to the main base;

a plurality of buttons;

a first actuator for extending, retracting, raising and lowering the pedestals; a pair of pedals at a front of the main base;

a second actuator for raising and lowering the movable base; and a controller electrically connected to the buttons for controlling the first actuator, and electrically connected to the pedals for controlling the second actuator.

15. The pedestal toilet of claim 14, wherein a first button of the buttons is configured to extend and raise the pedestals.

16. The pedestal toilet of claim 15, wherein a second button of the buttons is configured to lower and retract the pedestals.

17. The pedestal toilet of claim 14, wherein a first pedal of the pedals is configured to raise the movable base.

18. The pedestal toilet of claim 17, wherein a second pedal of the pedals is configured to lower the movable base.

19. The pedestal toilet of claim 14, further comprising a pair of compartments adjacent to the main base, wherein the pedestals are contained within the compartments when the pedestals are in a retracted position.

* * * * *